UNITED STATES PATENT OFFICE.

CLIFFORD A. WOODBURY, OF MIDDLETOWN TOWNSHIP, DELAWARE COUNTY, PENNSYLVANIA, ASSIGNOR TO E. I. du PONT de NEMOURS AND COMPANY, OF WILMINGTON, DELAWARE, A CORPORATION OF DELAWARE.

PROCESS OF REFINING CRUDE TRINITROTOLUOL AND OTHER CRUDE AROMATIC NITRO COMPOUNDS.

1,309,559.      Specification of Letters Patent.      Patented July 8, 1919.

No Drawing.      Application filed November 5, 1917. Serial No. 200,368.

*To all whom it may concern:*

Be it known that I, CLIFFORD A. WOODBURY, of Middletown township, in the county of Delaware, and in the State of Pennsylvania, have invented a certain new and useful Improvement in Processes of Refining Crude Trinitrotoluol and other Crude Aromatic Nitro Compounds, and do hereby declare that the following is a full, clear, and exact description thereof.

The object of my invention has been to provide a process of refining the crude products that are obtained by the direct nitration of aromatic nitro compounds, such as toluol and xylol, in order to obtain the form of trinitrotoluol or of trinitroxylol which will be satisfactory as military explosives, which process shall have the advantages of relatively low cost of solvents; of permitting the use of a solvent which is non-inflammable; and of permitting the use of one which is not substantially volatile.

To such ends, my invention consists in the process of refining crude aromatic nitro compounds hereinafter specified.

The usual methods employed for the refining of the said crude trinitrotoluol to remove the undesirable constituents consist in dissolving the crude mixture in such solvents as benzol, toluol or alcohol, and then depositing the refined crystals from the solutions thus obtained. The solvents thus used are expensive and are very inflammable, thus adding a decided additional fire and explosion risk in the refining of the crude trinitrotoluol. Furthermore, these costly solvents are very volatile, and the losses during the process of refining are necessarily very great.

The object of my invention has been to provide a process of refining crude trinitrotoluol and other crude aromatic nitro compounds which are not subject to the above-mentioned objections.

The new process to which I refer consists in washing the crystals of crude trinitrotoluol or other similar nitro bodies at ordinary temperatures with sulfuric acid. I have found that the sulfuric acid has the power of freeing the crude trinitrotoluol and other crude aromatic nitro compounds, such as trinitroxylol, of the impurities which render them unsatisfactory for certain military purposes.

My process is capable of being practised in many different ways. While I shall illustrate my process by describing a particular method of carrying it out, such illustration is to be regarded as typical only of many possible procedures by which my invention can be practised.

It is also to be understood that my invention embraces the use not only of sulfuric acid, but of any equivalent thereof.

In the said method of practising my invention, as applied to crude trinitrotoluol, 100 parts by weight of the crystals of crude trinitrotoluol are introduced into a mixing vessel and 200 parts by weight of sulfuric acid, having a strength of 93%, are added. The mixture is then stirred until thorough mixing is obtained and is then discharged from the mixing vessel to a filter. After the sulfuric acid carrying the impurities from the crude trinitrotoluol has drained from the mass on the filter, fresh sulfuric acid is run on top of the crystals, in order to replace the mother liquor acid held in the crystals. The crystals wet with acid are then discharged from the filter and freed from acid by any method suitable for this purpose, such as washing with water and with a weak solution of alkali, in order to neutralize the final traces of acid.

The washing process can, of course, be carried out by other methods, such, for example, as charging the crude crystals of trinitrotoluol directly on the filter and then washing on the filter with sulfuric acid. In any case, however, the treatment with sulfuric acid is preferably so carried out as to avoid substantial dissolution of trinitrotoluol in the acid.

The amount of acid used will vary, depending upon the temperature and strength of the acid and on the degree of purity desired in the refined trinitrotoluol. When using strong acids, such as 100% $H_2SO_4$, a small amount of acid has a relatively high refining value, and a weak acid, such as 70% $H_2SO_4$, has a low refining value. I prefer, however, to use acid of 66° Bé. strength, inasmuch as it is an acid produced in this country in large quantities and can be handled without any great danger from freezing.

Crude trinitroxylol can be purified by treatment with the same acid and alkali solutions and in the same proportions, as above given in connection with trinitrotoluol. It will, of course, be understood that wide variations from the conditions there given can be used, and desirable results still be obtained.

I claim:

1. The process of refining aromatic nitro-compounds, comprising mixing the crude aromatic nitro-compound and sulfuric acid at ordinary temperature, and then removing from the undissolved aromatic nitro-compounds the liquid containing impurities.

2. The process of refining trinitrotoluol, comprising mixing crude trinitrotoluol and sulfuric acid at ordinary temperature, and then removing from the undissolved trinitrotoluol the liquid containing impurities.

3. The process of refining trinitrotoluol, comprising mixing crude trinitrotoluol and sulfuric acid at ordinary temperature, and then removing the liquid from undissolved trinitrotoluol by filtration.

4. The process of refining trinitrotoluol, comprising mixing crude trinitrotoluol and sulfuric acid, then removing the liquid from undissolved trinitrotoluol by filtration, and then washing with water and with a solution of alkali the residue of trinitrotoluol.

In testimony that I claim the foregoing I have hereunto set my hand.

CLIFFORD A. WOODBURY.

Witnesses:
W. F. TWOMBLY,
A. M. TAYLOR.